(12) United States Patent
Lee et al.

(10) Patent No.: US 11,581,848 B2
(45) Date of Patent: Feb. 14, 2023

(54) METHOD OF DIAGNOSING MALFUNCTIONING OF BYPASS DIODE IN SOLAR PHOTOVOLTAIC BATTERY

(71) Applicants: HYUNDAI MOTOR COMPANY, Seoul (KR); KIA MOTORS CORPORATION, Seoul (KR)

(72) Inventors: Eun Yeong Lee, Seoul (KR); Mi Yeon Song, Seoul (KR); Young Chan Kim, Seoul (KR); Sung Geun Park, Suwon-si (KR); Sang Hak Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 242 days.

(21) Appl. No.: 17/028,754

(22) Filed: Sep. 22, 2020

(65) Prior Publication Data
US 2021/0091718 A1 Mar. 25, 2021

(30) Foreign Application Priority Data
Sep. 25, 2019 (KR) .................. 10-2019-0117962

(51) Int. Cl.
| H02S 50/10 | (2014.01) |
| H01M 10/46 | (2006.01) |
| H01M 10/48 | (2006.01) |
| H02S 40/38 | (2014.01) |

(52) U.S. Cl.
CPC .......... *H02S 50/10* (2014.12); *H01M 10/465* (2013.01); *H01M 10/48* (2013.01); *H02S 40/38* (2014.12); *H01M 2220/20* (2013.01)

(58) Field of Classification Search
None
See application file for complete search history.

(56) References Cited

U.S. PATENT DOCUMENTS

2018/0251034 A1* 9/2018 Lee .................. H02J 3/381

FOREIGN PATENT DOCUMENTS

| JP | 3216295 U | * | 5/2018 |
| KR | 10-1245827 B | | 3/2013 |
| KR | 10-1886488 B | | 8/2018 |

OTHER PUBLICATIONS

Ji, Yang-Geun et al., The Characteristic of the Performance of the Bypass Diode with Composition Change of the String in Si-PV Module, Trans KIEE., vol. 59, No. 12, Dec. 2010, pp. 2213-2217.

* cited by examiner

*Primary Examiner* — Patrick Assouad
*Assistant Examiner* — Haidong Zhang
(74) *Attorney, Agent, or Firm* — Morgan, Lewis & Bockius LLP

(57) ABSTRACT

A method of diagnosing malfunctioning of a bypass diode in a solar photovoltaic battery system is provided. The method may include: collecting solar photovoltaic battery operation information indicating a solar photovoltaic battery operation state, from a signal of a solar photovoltaic battery detection unit, while maximum power point tracking control is performed with the solar photovoltaic battery system in operation; and determining whether or not the bypass diodes based on the collected solar photovoltaic battery operation information.

20 Claims, 23 Drawing Sheets

[DIODE IS NORMAL AND ONE CELL IS SHADED]

[DIODE IS DAMAGED, BYPASS CIRCUIT IS OPEN, AND ONE CELL IS SHADED]

[DIODE IS DAMAGED, BYPASS CIRCUIT IS OPEN, AND TWO CELLS ARE SHADED]

METHOD OF DIAGNOSING MALFUNCTIONING OF BYPASS DIODE IN SOLAR PHOTOVOLTAIC BATTERY

CROSS-REFERENCE TO RELATED APPLICATION

The present application claims priority to and the benefit of Korean Patent Application No. 10-2019-0117962, filed Sep. 25, 2019, the entire contents of which is incorporated herein for all purposes by this reference.

TECHNICAL FIELD

The present disclosure relates to a method of diagnosing malfunctioning of a bypass diode in a solar photovoltaic battery.

BACKGROUND

In recent years, considerable effort has been made to develop alternative energy to solve problems such as depletion of fossil fuels such as coal, oil, and gas, and environmental pollution due to the use of the fossil fuels. A result of this effort is a solar power generation system using solar energy.

Solar power generation is a technology that converts solar energy, solar thermal energy, or solar photovoltaic energy, into electrical energy. A solar photovoltaic battery that is configured with a semiconductor chip is used for solar power generation that converts sunlight into electrical energy.

The solar photovoltaic battery is a photovoltaic conversion element that converts sunlight into electrical energy. In the solar photovoltaic battery, a basic unit that has a function of converting optical energy of the sun into electrical energy is referred to as a cell. A group that results from connecting these cells (or solar battery modules) in series is referred to as a string.

Generally, in a solar photovoltaic battery system, a solar photovoltaic battery string is configured with multiple solar photovoltaic battery cells or solar photovoltaic battery modules that are serially connected. In addition, a backflow prevention diode and a bypass diode are then installed in contact with each string, and auxiliary devices such as a surge protection device, a DC circuit breaker, and a connection box are further installed to constitute a solar photovoltaic battery array.

With the configuration in which the backflow prevention diode is installed in contact with each solar photovoltaic battery string, backflow due to a potential difference between strings is prevented, and an imbalance in output voltage between the strings in the solar photovoltaic battery system is prevented.

In addition, a bypass circuit is connected between both ends of each solar photovoltaic battery, and the bypass diode is installed in each bypass circuit. Thus, in a case where one portion of a cell is shaded, the bypass diode prevents the cell from being damaged by a hot spot attributable to current hogging.

A position of the solar photovoltaic battery in the solar photovoltaic battery system is very important. In addition, in order to expect the highest output, the solar photovoltaic battery has to be installed at an angle at which solar energy is most readily absorbed.

At this time, a factor to consider is the hot spot that occurs due to shade. Shading a very small portion of the solar photovoltaic battery cell or module can greatly decrease an output of the entire solar photovoltaic battery.

Accordingly, in order to prevent a loss due to shade, the bypass diode is installed in contact with each solar photovoltaic battery string. Thus, current is caused to flow taking a detour around a cell or a cell group (module) of which an output decreases due to shade and a reduction in output is caused to be limited only to a portion of the cell or the cell group, which is shaded. Thus, an output of the entire solar photovoltaic battery is maintained.

On the other hand, when the bypass diode malfunctions, the bypass circuit for the string can be open or shorted. Therefore, a technology that can precisely diagnose whether or not the bypass diode malfunctions or a state of the bypass circuit and then can alert an operator to the results of the diagnosis is needed.

SUMMARY

According to an aspect of the present disclosure, a method of diagnosing malfunctioning of a bypass diode in a solar photovoltaic battery system that includes multiple solar photovoltaic battery strings, each string being configured with multiple solar photovoltaic battery cells or solar photovoltaic battery modules that are serially connected and which has a configuration in which a bypass circuit is connected to both ends of each solar photovoltaic battery string in a state where the multiple solar photovoltaic battery strings are serially connected and in which the bypass diode is installed in each bypass circuit for each of the solar photovoltaic battery strings, the method including: causing a control unit to collect solar photovoltaic battery operation information indicating a solar photovoltaic battery operation state, from a signal of a solar photovoltaic battery detection unit, while maximum power point tracking control is performed with the solar photovoltaic battery system in operation; and causing the control unit to determine whether or not the bypass diodes installed in the bypass circuits for the solar photovoltaic battery strings malfunction, on the basis of the collected solar photovoltaic battery operation information, in which the solar photovoltaic battery operation information includes open circuit voltage in a circuit that includes the multiple solar photovoltaic battery strings, and maximum power point voltage for maximum power point tracking control.

Therefore, with the method of diagnosing malfunctioning of a bypass diode in a solar photovoltaic battery according to the present disclosure, the malfunctioning of the bypass diode installed in contact with the solar photovoltaic battery string may be diagnosed on the basis of information that is collected in the solar photovoltaic battery system.

DRAWINGS

Figure 3:
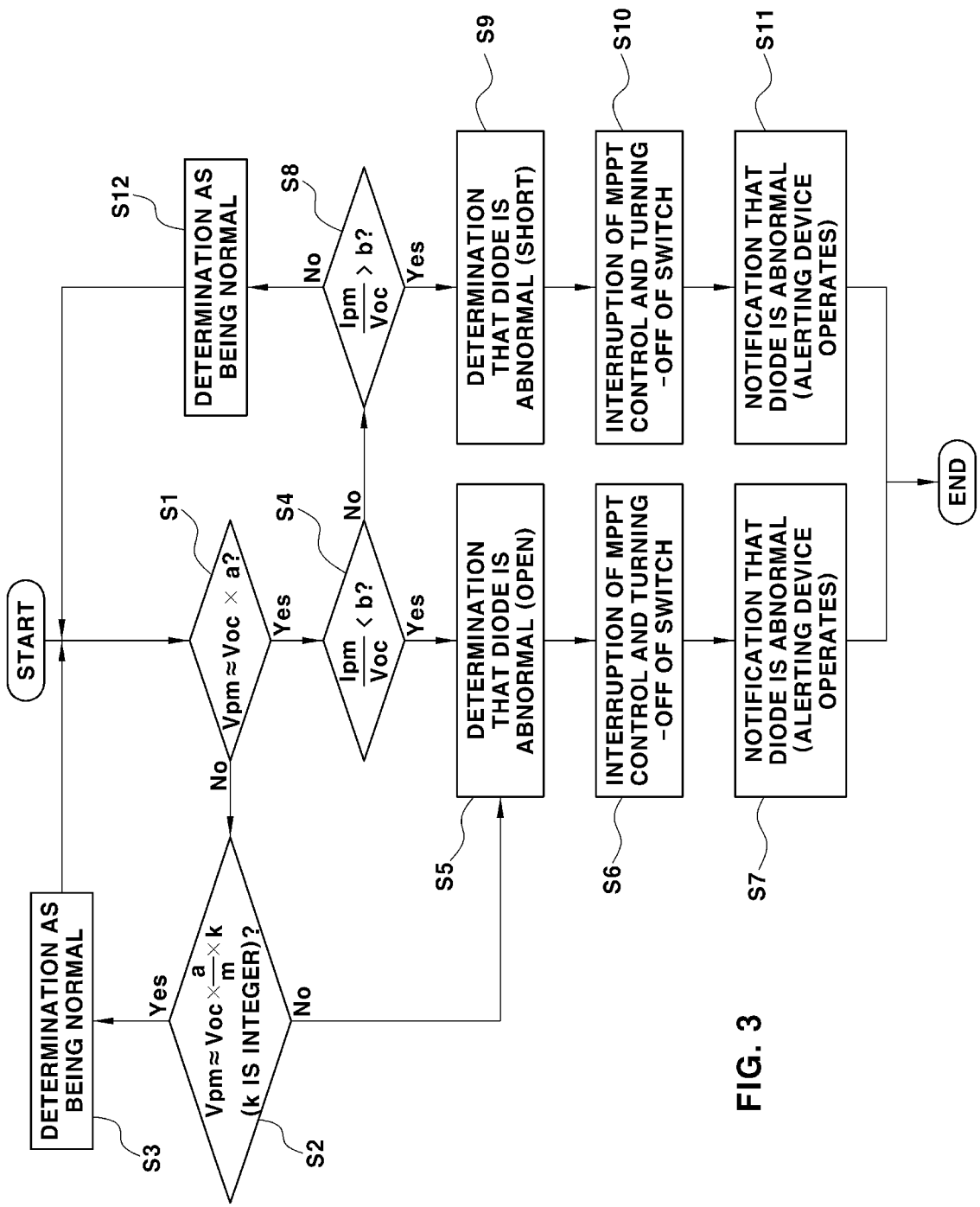
FIG. 3 is a flowchart illustrating the bypass diode malfunctioning diagnosis process in one form of the present disclosure.
Figure 7:
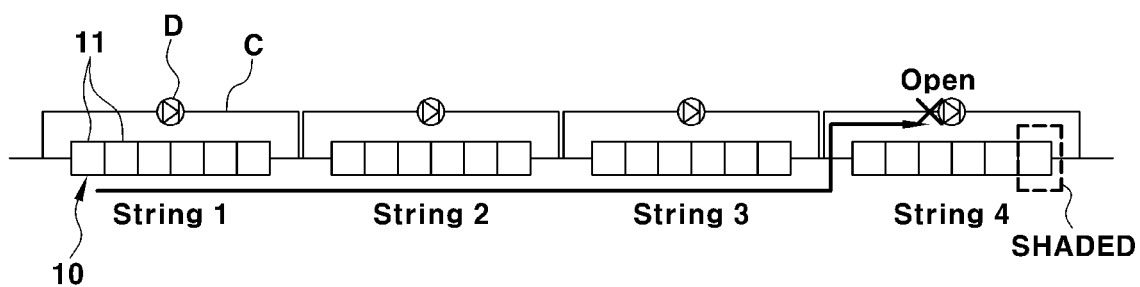
FIG. 7 is a diagram illustrating a state where one or several cells of the solar photovoltaic battery are shaded in a malfunctioning state of the diode that is diagnosable in one form of the prevent disclosure.
Figure 8A:
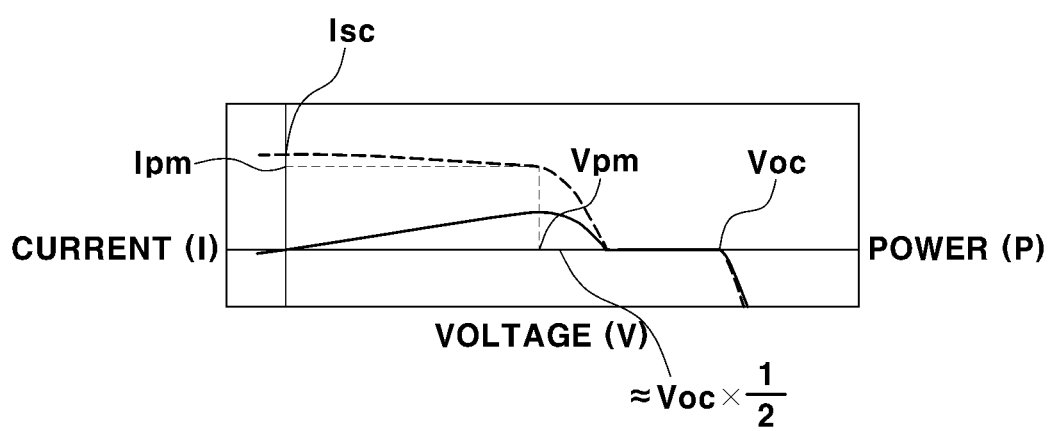
Figure 8B:
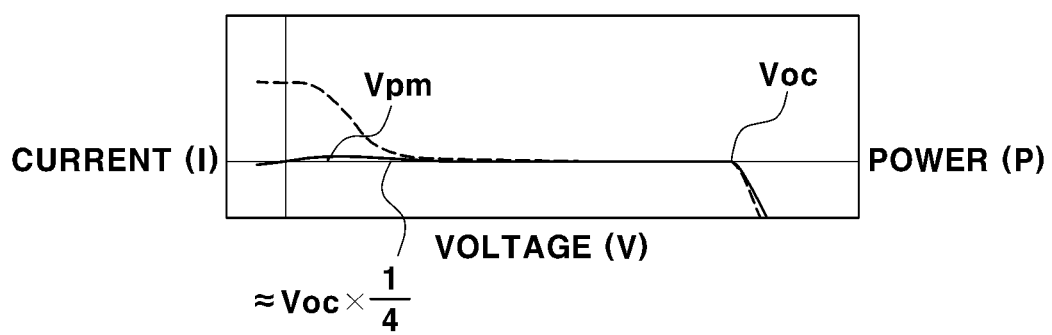
Figure 8C:
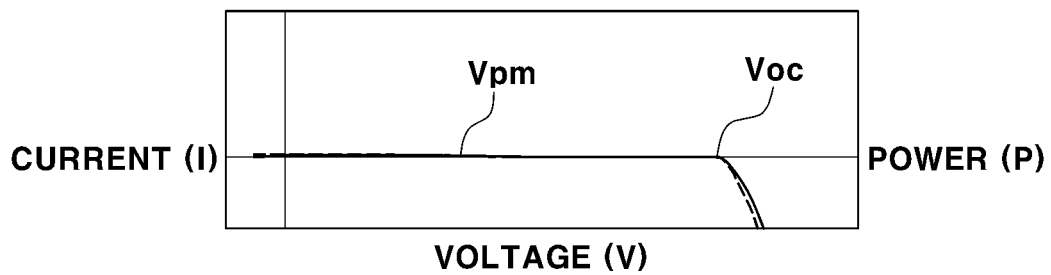
Figure 9:
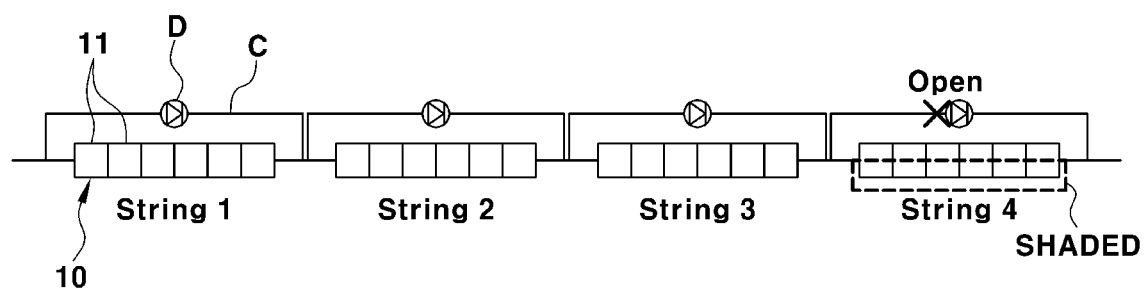
Figure 10:
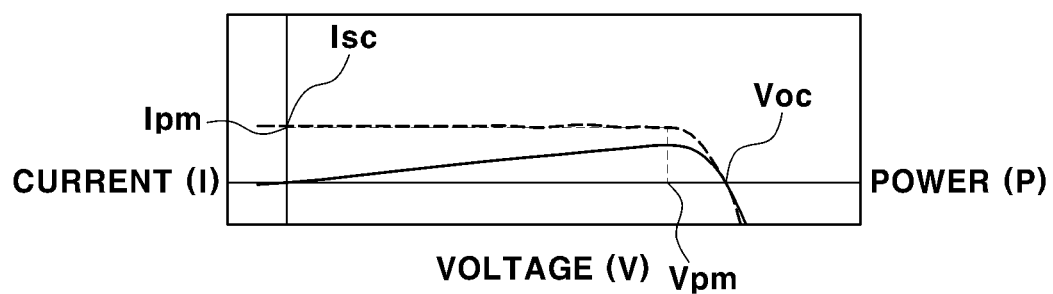
Figure 11:
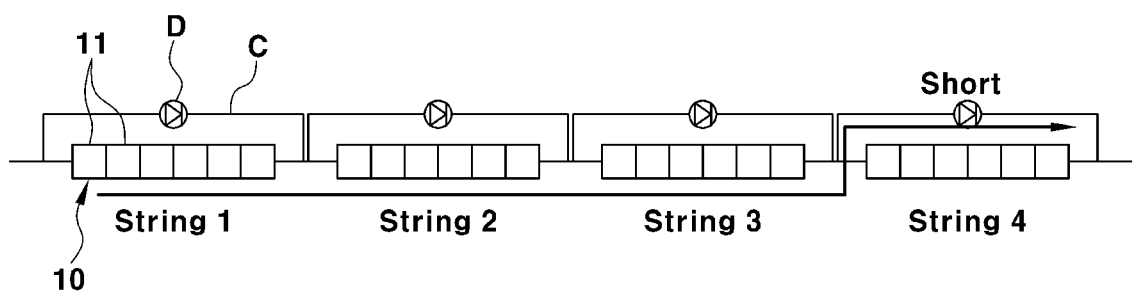
Figure 12:
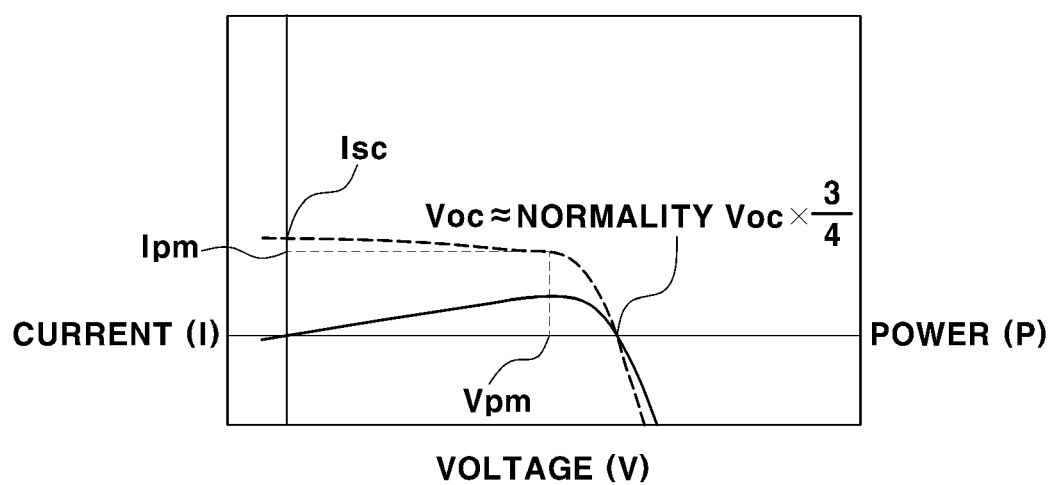
Figure 13:
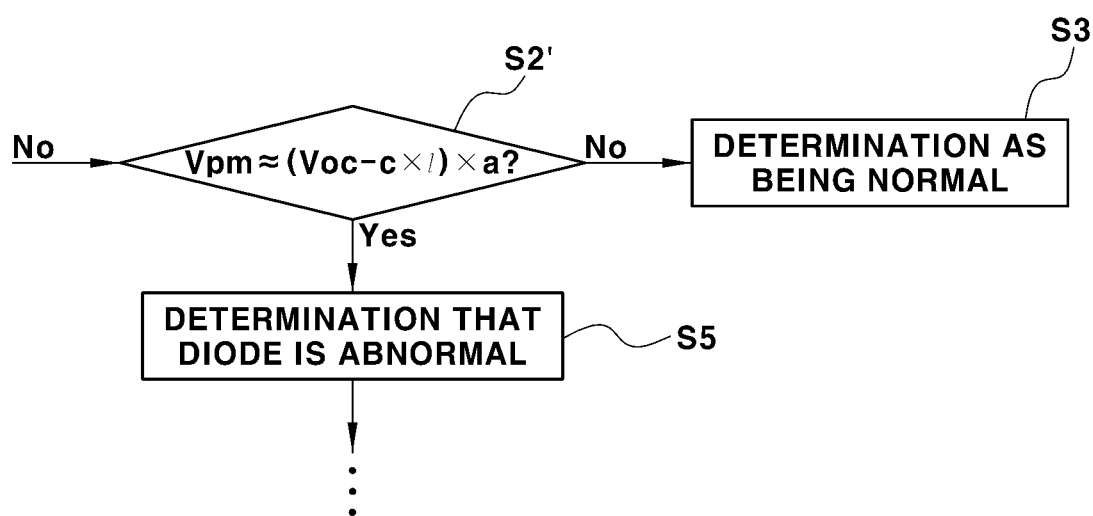
Figure 14:
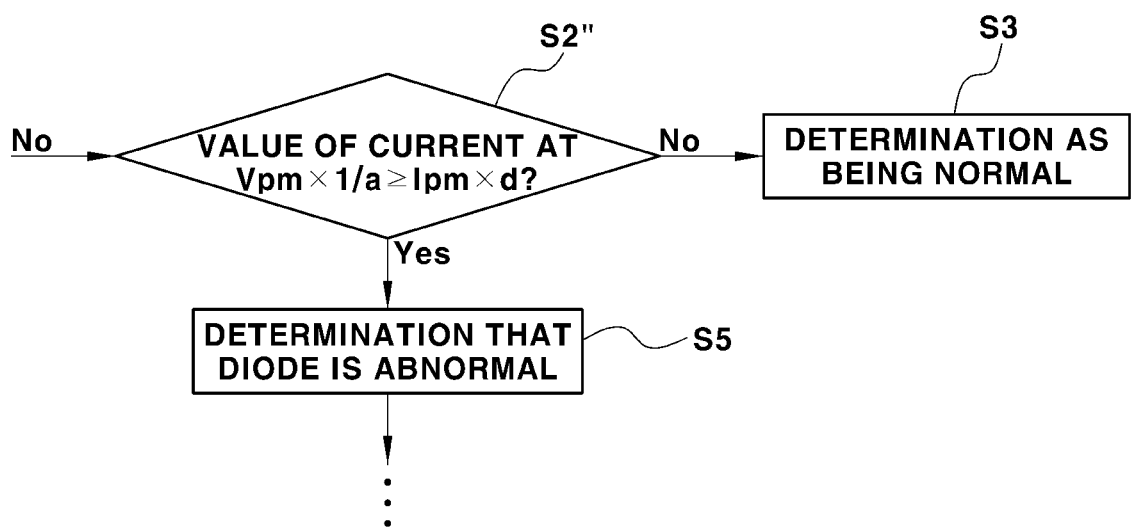
Figure 15:
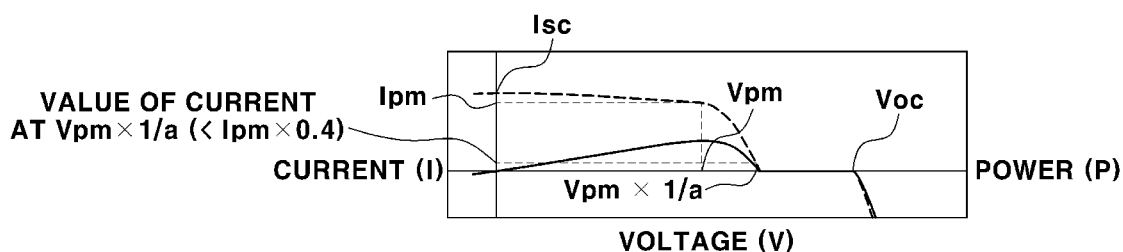
Figure 15:
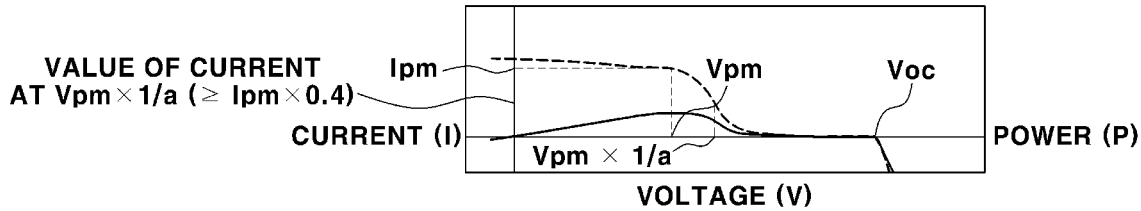
Figure 15:
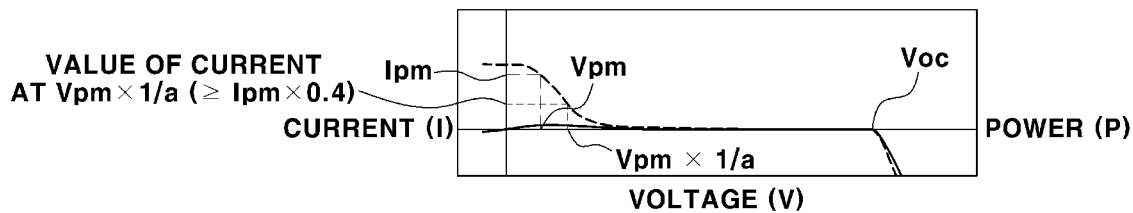
Figure 16:
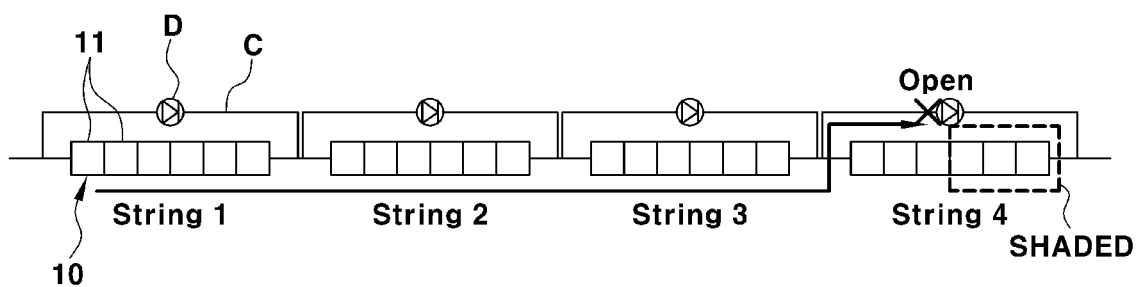
Figure 17:
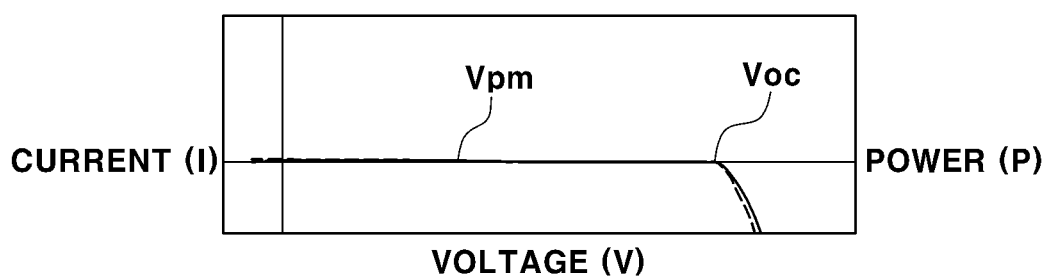
Figure 18:
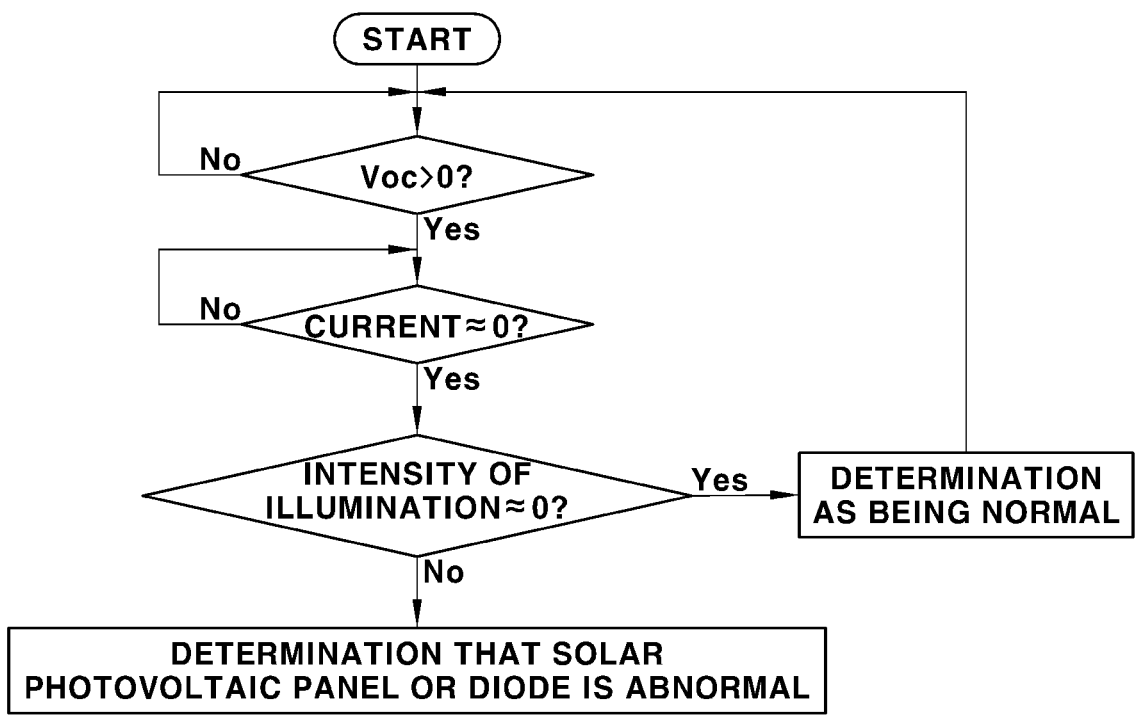
Figure 19:
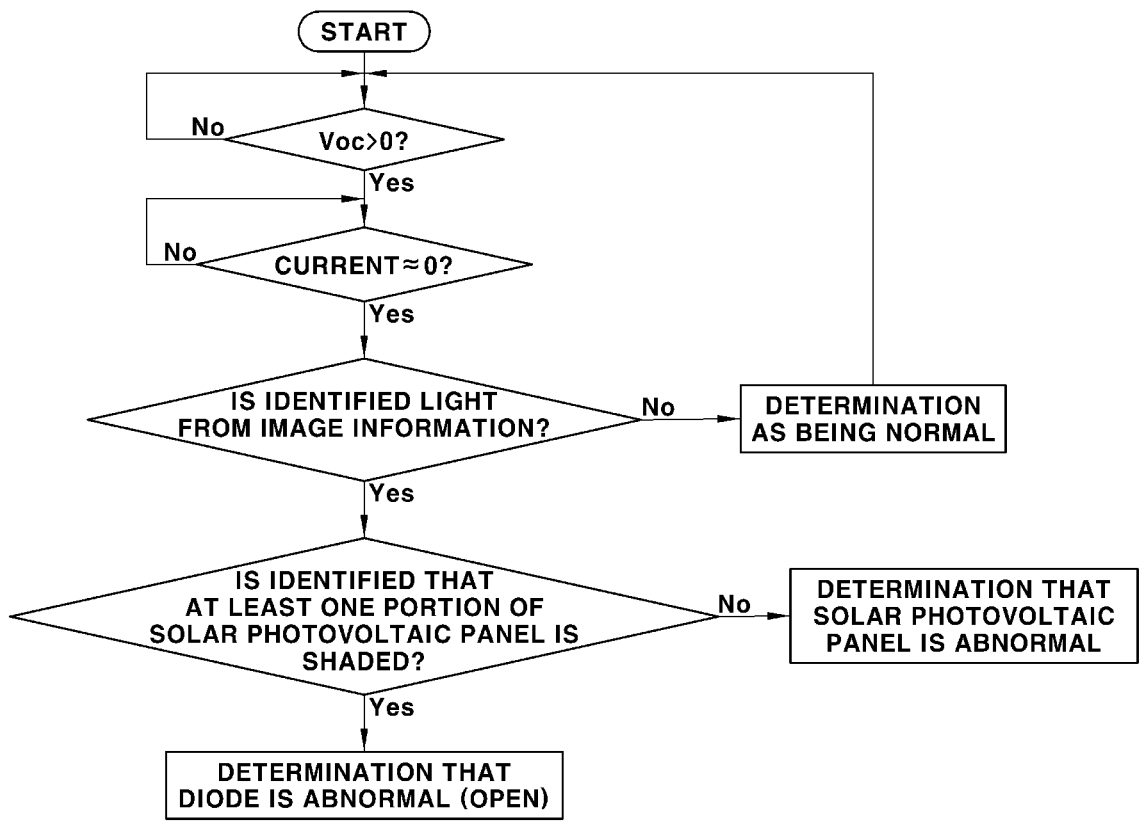
Figure 20A:
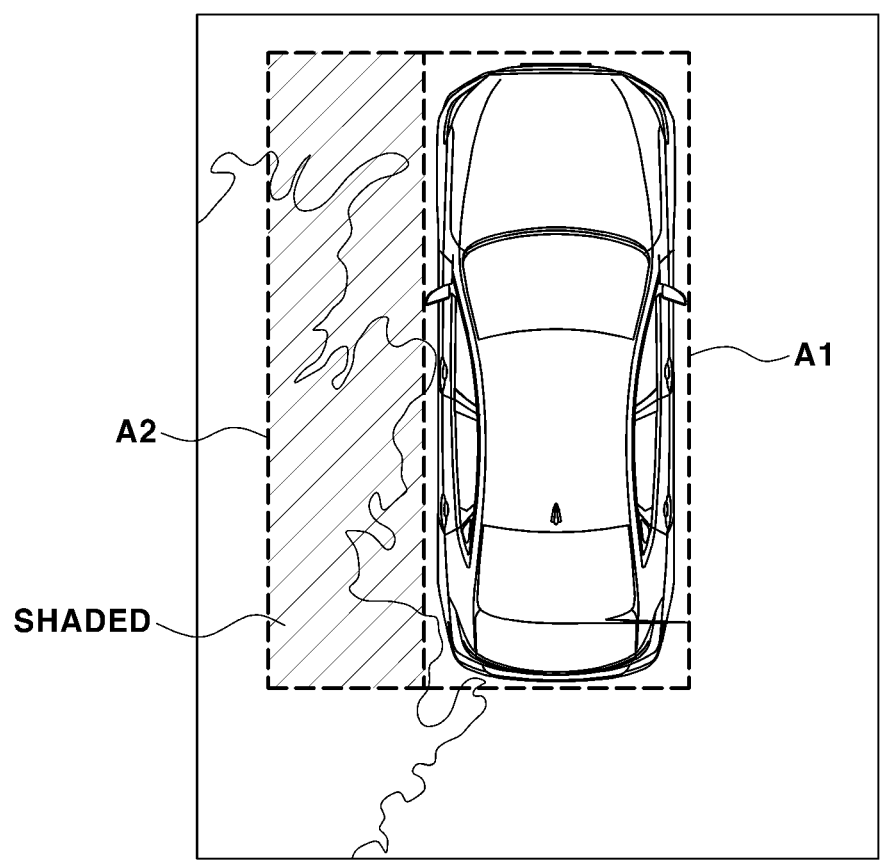
Figure 20B:
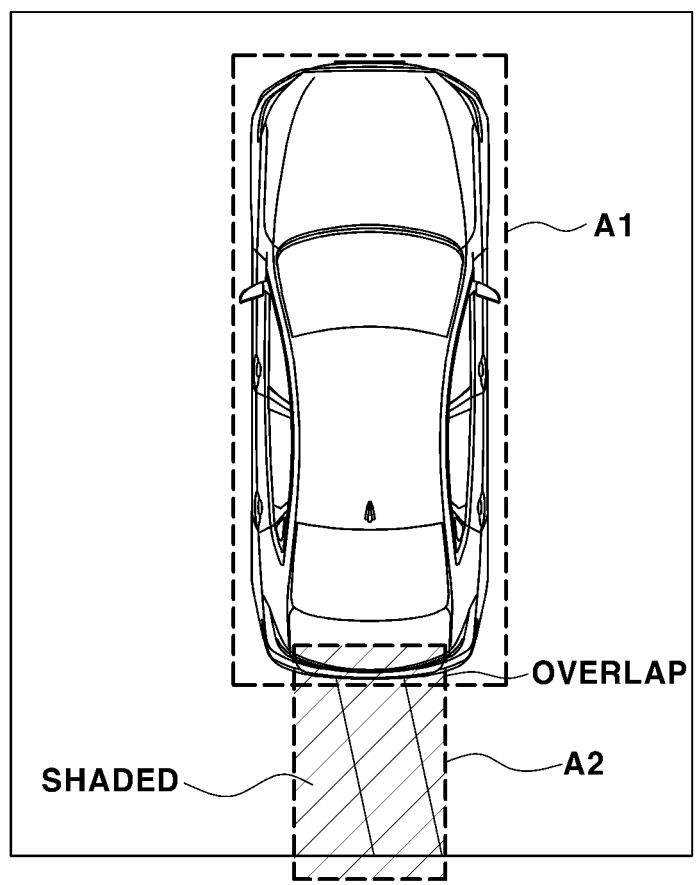

FIGS. 8A, 8B, and 8C are diagrams, each illustrating the graph I-V of current versus voltage and the graph P-V of current versus voltage in the state in FIG. 7;

FIG. 9 is a diagram illustrating a state where all cells in a string are shaded in the malfunctioning state of the diode that is diagnosable in one form of the prevent disclosure;

FIG. 10 is a diagram illustrating the group I-V of current versus voltage and the group P-V of power versus voltage in the state in FIG. 9;

FIG. 11 is a diagram illustrating the malfunctioning state of the diode that is diagnosable in one form of the prevent disclosure, and a shorted state of a bypass circuit due to the malfunction of the diode;

FIG. 12 is a diagram illustrating the graph I-V of current versus voltage and the graph P-V of power versus voltage in the state in FIG. 11;

FIG. 13 is a diagram illustrating a malfunctioning diagnosis process in one form of the present disclosure;

FIG. 14 is a diagram illustrating a malfunctioning diagnosis process in one form of the present disclosure;

FIG. 15 is a diagram illustrating the graph I-V of current versus voltage and the graph P-V of power versus voltage in the malfunctioning diagnosis process in one form of the present disclosure;

FIG. 16 is a diagram illustrating the malfunctioning state of the diode that is diagnosable in one form of the present disclosure, and a shaded state of the diode;

FIG. 17 is a diagram illustrating the graph I-V of current versus voltage and the graph P-V of power versus voltage in the state in FIG. 16;

FIGS. 18 and 19 illustrate a malfunctioning diagnosis process in one form of the present disclosure, which can be added in addition to the process in FIG. 3; and FIGS. 20A and 20B are diagrams, each illustrating images of a vehicle and the vicinity of the vehicle in one form of the present disclosure.

DETAILED DESCRIPTION

Embodiments of the present disclosure will be described in detail below with reference to the accompanying drawings in such a manner that a person of ordinary skill in the art to which the present disclosure pertains is enabled to practice them without undue experimentation. However, the present disclosure is not limited to the embodiment that is described here and may be implemented into other embodiments.

When the expression "includes a certain constituent element" is used throughout the specification, unless otherwise described, this expression means "further includes any other constituent element, not "excluding any other constituent element".

Figure 1:
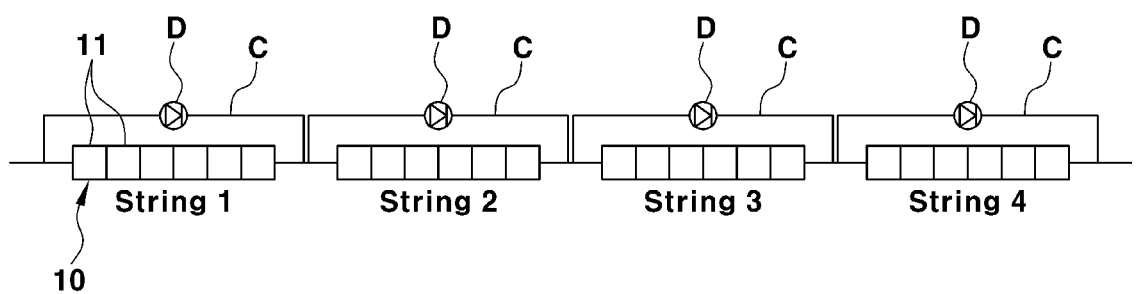
FIG. 1 is a diagram illustrating a configuration and a connected state of a solar photovoltaic battery string to which a malfunctioning diagnosis process in one form of the present disclosure is applicable, and an installed state of a bypass diode.

FIG. 1 is a diagram illustrating solar photovoltaic battery strings in a solar photovoltaic battery system to which a bypass diode malfunctioning diagnosis process according to the present disclosure is applicable. In FIG. 1, a state is illustrated where a bypass diode D is installed for each solar photovoltaic battery string 10.

As illustrated, multiple solar photovoltaic battery cells 11 that are serially connected constitute an individual solar photovoltaic battery string 10.

Instead of the multiple serially-connected solar photovoltaic battery cells, multiple cell groups, each of which includes the serially-connected cells, that is, multiple serially-connected solar photovoltaic battery modules may constitute the solar photovoltaic battery string 10 here.

That is, in FIG. 1, reference numeral 11 may denote a cell that is a unit element which constitutes the solar photovoltaic battery string 10, or may denote a module instead of the cell.

Then, as illustrated in FIG. 1, multiple solar photovoltaic battery strings 10 may be serially connected. At this time, a bypass circuit C is connected between both ends of each solar photovoltaic battery string 10, and the bypass diode D is installed in each bypass circuit C.

Only four solar photovoltaic battery strings 10 are illustrated in FIG. 1, but this may result from omitting the remaining solar photovoltaic battery strings from the illustration.

That is, the number of the solar photovoltaic battery strings 10 that are illustrated in FIG. 1 is given as an example. The present disclosure is not limited to those illustrated, and the number m of the solar photovoltaic battery strings that are serially connected in the solar photovoltaic battery system in which the present disclosure finds application is changeable variously.

In addition, FIG. 1 illustrates that six cells (modules) 11 constitute one solar photovoltaic battery string 10. However, this does not impose a limit on the present disclosure, and the number of the cells (or the modules) 11 that constitute one solar photovoltaic battery string 10 is changeable variously.

In the related art, regarding a configuration of the solar photovoltaic battery system as described above, control methods are known in which in a case where a solar photovoltaic battery is shadowed, an operator is simply alerted that the solar photovoltaic battery is shadowed.

On the other hand, in a configuration in which the bypass diodes D are installed for the respective solar photovoltaic battery strings 10, when a bypass diode at a specific position is in a malfunctioning state and at least one portion of the solar photovoltaic battery string corresponding to the malfunctioning bypass diode is shadowed, a hot spot occurs because current generated in any other cell is converted into heat.

In this case, the risk of causing fire increases, so control for alerting the operator whether or not the bypass diode malfunctions is necessary in order to prevent the occurrence of a fire.

Accordingly, according to the present disclosure, there are disclosed a method of precisely diagnosing whether or not a bypass diode malfunctions, on the basis of solar photovoltaic battery operation information that is collected in a solar photovoltaic battery system and a method of providing guidance for repairing a solar photovoltaic battery system in a case where a bypass diode malfunctions.

For reference, in a normal solar photovoltaic battery system, maximum power point tracking (MPPT) control for controlling power generated by a solar photovoltaic battery is performed.

More particularly, the maximum power point tracking (hereinafter referred to as MPPT) control for enabling maximum power to be output in the solar photovoltaic battery according to a predetermined MPPT algorithm, using an output voltage (a solar photovoltaic battery voltage) and current of the solar photovoltaic battery, which are detected by a solar photovoltaic battery detection unit.

An operation point of the solar photovoltaic battery is determined by a loading condition. Accordingly, with the MPPT control, an output of and operation of a DC-DC converter that is a load can be controlled in such a manner that the operation point of the solar photovoltaic battery tracks a maximum power point.

In addition, in a case where the bypass diode operates normally and in a case where the bypass circuit for the solar photovoltaic battery string is open or shorted due to damage to the bypass diode, a relationship among an open circuit voltage Voc, a maximum power point voltage Vpm, and a maximum power point current Ipm changes.

According to the present disclosure, using this characteristic, it is diagnosed whether or not the bypass diode malfunctions. In a case where the bypass diode malfunctions, the malfunctioning state is notified to the outside using an alerting device.

According to the present disclosure, the alerting device is used to alert the operator to the results of diagnosis, such as the presence or absence of the malfunctioning bypass diode, or the state of the bypass diode. In a vehicle, the alerting device may be a display device that, for alerting, visually displays pieces of information, such as a state of the bypass pass circuit, in addition to the presence or absence of the malfunctioning bypass diode and the state of the bypass diode.

Figure 2:
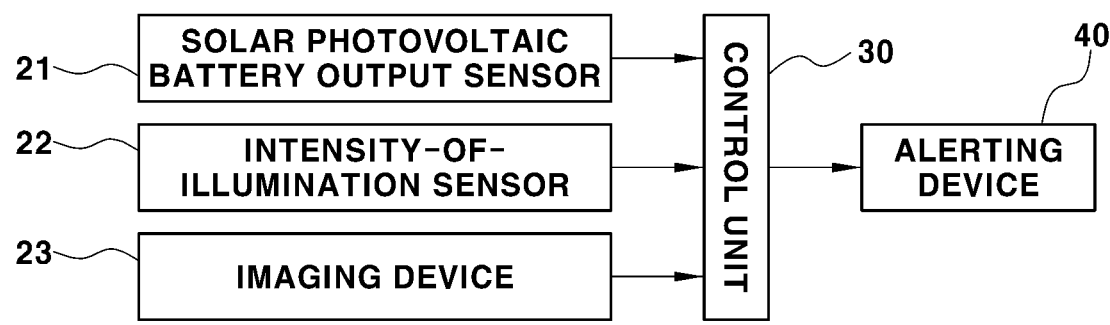
FIG. 2 is a diagram illustrating a configuration of a system that performs a bypass diode malfunctioning diagnosis process in one form of the present disclosure.

FIG. 2 is a diagram illustrating a configuration of a system that performs the bypass diode malfunctioning diagnosis process according to the embodiment of the present disclosure.

According to the present disclosure, it is diagnosed whether or not the bypass diode D malfunctions, on the basis of the solar photovoltaic battery operation information that is collected in the solar photovoltaic battery system. As a result of the diagnosis, pieces of information can be obtained such as the presence or absence of the malfunctioning bypass diode D, the state of the bypass diode, and also the state of the bypass circuit C.

According to the present disclosure, the solar photovoltaic battery operation information is information indicating a solar photovoltaic battery operation state, and may include the open circuit voltage Voc and the maximum power point voltage Vpm that are values of solar photovoltaic battery operation states in a circuit that includes the solar photovoltaic battery strings.

In addition to these, according to the present disclosure, the solar photovoltaic battery operation information may further include the maximum power point current Ipm, as another value of the solar photovoltaic battery operation state, in the circuit that includes the solar photovoltaic battery strings.

At this point, the open circuit voltage Voc and the maximum power point voltage Vpm, and the maximum power point current Ipm can be detected by a sensor 21 of the solar photovoltaic battery detection unit in the solar photovoltaic battery system, and the sensor 21 may be a known solar photovoltaic battery output sensor that detects voltage and current of the solar photovoltaic battery.

The normal solar photovoltaic battery system includes the solar photovoltaic battery output sensor that detects the voltage and the current of the solar photovoltaic battery. Real-time detection values from the solar photovoltaic battery output sensor, that is, values of the voltage and the current of the solar photovoltaic battery, which are values of signals of the solar photovoltaic battery output sensor, are set to be input into a control unit, more particularly, an MPPT control unit.

The voltage of the solar photovoltaic battery means an operating voltage of the solar photovoltaic battery, that is, the output voltage of the solar photovoltaic battery.

FIG. 2 illustrates a solar photovoltaic battery output sensor 21 for detecting the solar photovoltaic battery operation information, and a control unit 30 that diagnoses the malfunctioning of the bypass diode D for each solar photovoltaic battery string 10 in FIG. 1, on the basis of the solar photovoltaic battery operation information that is acquired from the signal of the solar photovoltaic battery output sensor 21.

According to the present disclosure, the control unit 30 that diagnoses the malfunctioning of the bypass diode may be the MPPT control unit in the solar photovoltaic battery system.

In addition, FIG. 2 illustrates an alerting device 40 that operates according to a control signal of the control unit 30. The control unit 30 outputs the control signal for alerting the operator to a result of diagnosing the malfunctioning of the bypass diode D through the alerting device 40. Thus, the alerting device 40 operates according to the control signal that is output by the control unit 30, thereby alerting the operator to the result of diagnosing the malfunctioning.

That is, as illustrated in FIG. 1, in a case where at least one of the bypass diodes D for the serially-connected solar photovoltaic battery strings 10 is in the malfunctioning state, the control unit 30 outputs the control signal for alerting the operator to the malfunctioning state of the bypass diode or the like, which is the result of diagnosing the malfunctioning. Thus, operation of the alerting device 40 is controlled according to the control signal that is output by the control unit 30, in such a manner that the operator is alerted to the malfunctioning state of the bypass diode D.

With this operation of the alerting device 40, the operator is notified of the malfunctioning state of the bypass diode D.

An intensity-of-illumination sensor 22 and an imaging device 23 will be described below with reference to FIG. 2.

A diode malfunctioning diagnosis process according to the present disclosure will be described in more detail below.

FIG. 3 is a flowchart illustrating the bypass diode malfunctioning diagnosis process according to the embodiment of the present disclosure.

A symbol "≈" in FIG. 3 indicates that two values on the left and right of the symbol are close to each other within a predetermined error limit. As will be described below, the symbol "≈" in Step S1 indicates that two values on the left and right of the symbol are close to each other within a predetermined first error limit, and the symbol "≈" in Step S2 indicates that two values on the left and right of the symbol are close to each other within a predetermined second error limit.

In terms of meaning, abnormalities of a diode in FIG. 3 include damage to the bypass diode D, and an abnormal state of the bypass circuit C due to the damage, that is, an open state or a short state of the circuit.

In addition, as illustrated in FIG. 3, the bypass diode malfunctioning diagnosis process according to the present disclosure starts with a process in which the control unit 30 identifies a voltage state in a case where a solar photovoltaic battery output Pm is at or below a given value, or periodically (for example, a process in which the control unit 30 identifies whether or not a Vpm/Voc ratio takes an appropriate numerical value) (S1).

Figure 4:
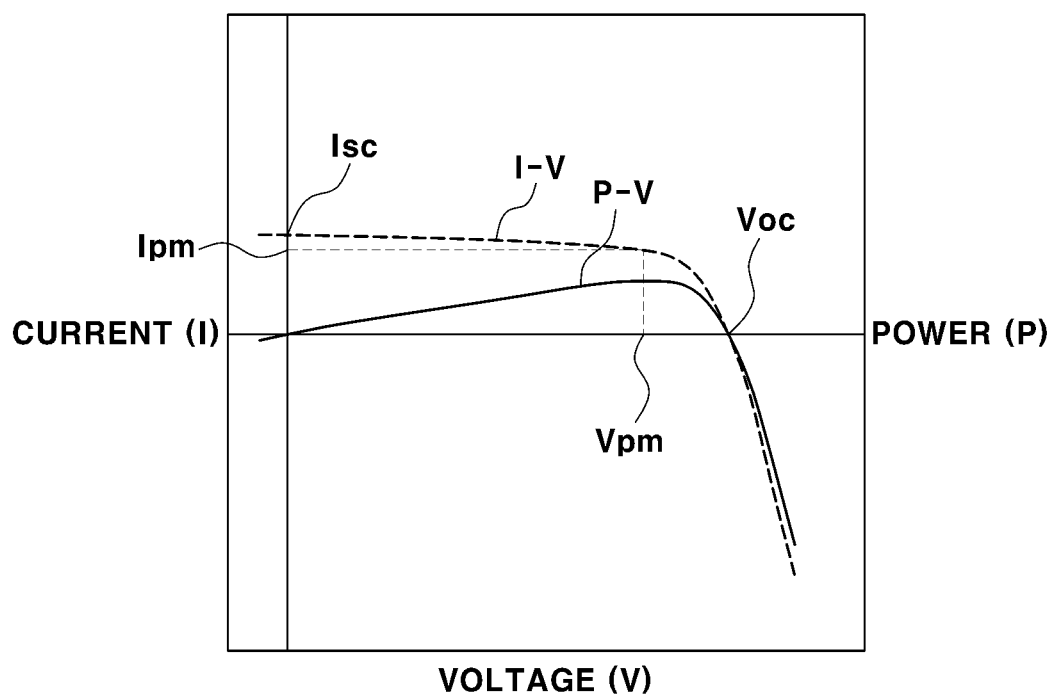
FIG. 4 is a diagram illustrating a graph I-V of current versus voltage and a graph P-V of power versus voltage, both of which show that the entire solar photovoltaic battery is not shaded in a normal state of a diode that is diagnosable in one form of the prevent disclosure.

FIG. 4 is a diagram illustrating a graph I-V of current versus voltage and a graph P-V of power versus voltage, both of which show when all the bypass diode D in the solar photovoltaic battery system are in a normal state and when the solar photovoltaic battery operation state where no string 10 is shaded (that is, a state where none of all the strings is shaded) is entered.

On the graph I-V of current versus voltage in FIG. 4, current that results when voltage V of the solar photovoltaic battery is 0 V is a short-circuit current Isc. On the graph P-V of power versus voltage, voltage V at a maximum power point position (a peak position on the graph P-V) at which power P takes a maximum value is the maximum power point voltage Vpm.

In addition, current I at the maximum power point position is the maximum power point current Ipm, and the open circuit voltage Voc is voltage V that results when the current I and the power P are 0.

That is, on the graph P-V of current versus voltage in FIG. 4, the voltage V at the maximum power point position (the peak position on the graph P-V) at which the power P takes a maximum value, and on the graph I-V of current versus voltage, current at the maximum power point voltage Vpm is the maximum power point current Ipm.

When all the bypass diodes D operate normally and when none of all the strings 10 is in a shaded state, the graph I-V of current versus voltage takes the form of a "¬"-shaped curve as illustrated in FIG. 4.

In addition, when all bypass diodes D operate normally and when none of all the strings 10 is in the shaded state, the maximum power point voltage Vpm takes a specific value a of a ratio with respect to the open circuit voltage Voc.

That is, when the solar photovoltaic battery is not shaded, this is defined as "Vpm/Voc=a" where "a" is determined in advance, and represents a value of a ratio of the maximum power point voltage Vpm to the open circuit voltage Voc, when all the bypass diodes operate in the normal state and when none of all the strings is shaded, in the solar photovoltaic battery system with the same specification.

For example, when all the bypass diode D operate normally and when none of all the strings 10 is in the shaded state, the value a of the ratio of the maximum power point voltage Vpm to the maximum power point voltage Vpm is 0.8 (which, when converted to a percentage value, is 80%).

In this manner, the value a of the ratio of the maximum power point voltage Vpm to the open circuit voltage Voc varies depending on a characteristic or a specification of the cell 11 that constitutes the solar photovoltaic battery system. When a specification of a cell is determined, the value a of the ratio of the maximum power point voltage Vpm to the open circuit voltage Voc is determined. Thus, an approximate characteristic value a of the ratio is input into the control unit 30 for storage and can be used for diagnosing the malfunctioning of the bypass diode D.

Figure 5:
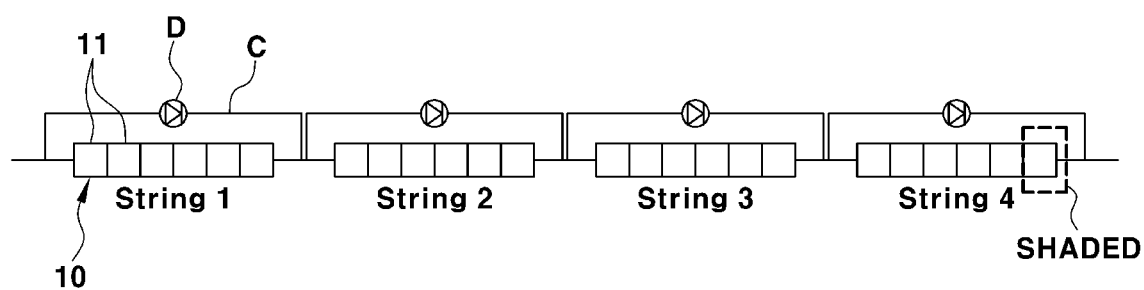
FIG. 5 is a diagram illustrating a state where one or several cells of the solar photovoltaic battery are shaded in the normal state of the diode that is diagnosable in one form of the prevent disclosure.

Next, FIG. 5 is a diagram illustrating a case where, a small portion of at least one of all the strings 10, for example, a small portion of one string is shaded and where all the bypass diodes D operate normally.

Figure 6:
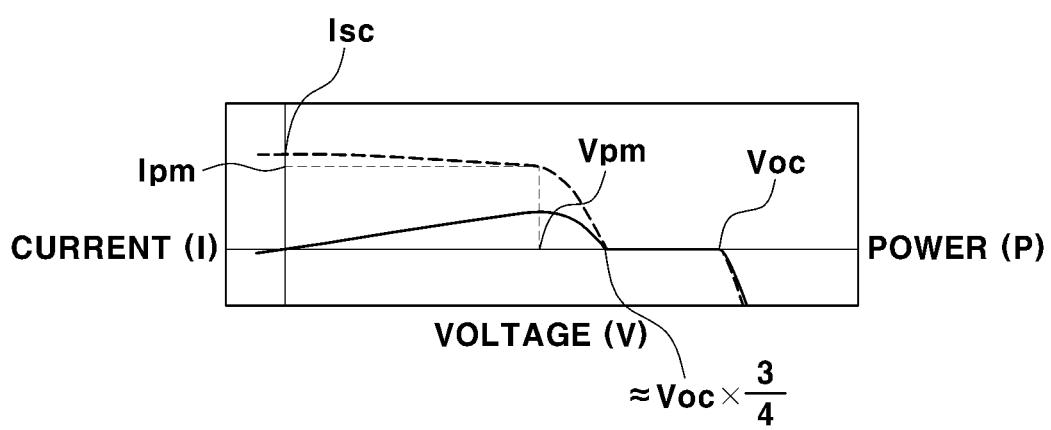
FIG. 6 is a diagram illustrating the graph I-V of current versus voltage and the graph P-V of power versus voltage in a state in FIG. 5.

FIG. 5 is a diagram illustrating a state where one cell in one string is shaded. FIG. 6 is a diagram illustrating the graph I-V of current versus voltage and the graph P-V of power versus voltage in an operating state in FIG. 5.

In the case of the state in FIG. 5, as illustrated in FIG. 6, the graph I-V of current versus voltage takes the form of a stair.

In addition, as in FIG. 5, in a case where at least one of all the strings 10 is shaded, although all the bypass diodes D are in the normal state, when a value of the maximum power point voltage "Vpm" and a value of "Voc×a" are compared, there is a difference therebetween.

Accordingly, in a bypass diode diagnosis process according to the present disclosure, in order to separately identify a normal operating state where all the bypass diodes D operate normally and where none of all the strings 10 is shaded, the control unit 30 compares the value of the maximum power point voltage "Vpm" and the value of "Voc×a" and determines whether or not the two values are close to each other within the predetermined first error limit (Step S1 in FIG. 3).

That is, the control unit 30 is set to determine whether or not a difference (an error) between the value of the maximum power point voltage "Vpm" and the value of "Voc×a" is within the first error limit, in the bypass diode malfunctioning diagnosis process, and a subsequent diagnosis process varies depending on whether or not the difference between the two values is within the first error limit.

In addition, although the difference between the two values is not values within the first error limit, there are cases where all the bypass diodes D can be in the normal state. However, in such cases, all the bypass diodes are in the normal state, but at least one string of all the strings 10 can be in the shaded state.

That is, in a case where all the diodes D operate normally, but where at least one of all the strings 10, for example, one string of all strings 10 is shaded, the difference between the two values is not the values within the first error limit.

In addition, in a case where all the bypass diodes D operate normally, but where at least one of all the strings 10, for example, one string of four strings, is shaded, as known from the graph I-V of current versus voltage in FIG. 6, when voltage is lower than ¾ (=n/m) of the open circuit voltage Voc, current occurs, and when voltage ranges from ¾ (=n/m) of the open circuit voltage Voc to the open circuit voltage Voc, current is 0.

At this point, ¾ is obtained from n/m=¾ where "m" is the number (that is, the number of all the strings) of all the bypass diodes D and "n" is the number of the bypass diodes for the strings 10 that are not shaded (that is, the number of the strings that are not shaded).

In addition, the maximum power point voltage Vpm occurs at a point at which voltage is a times ¾ (=n/m) of the open circuit voltage Voc (for example, 0.8 times when a=0.8), that is, a point at which voltage is "a×100"% of ¾ of the open circuit voltage Voc (for example, a point at which voltage is "0.8×100=80"%).

Accordingly, the maximum power point voltage Vpm is expressed as follows.

$$Vpm = Voc \times (n/m) \times a = Voc \times (a/m) \times n \tag{1}$$

where "Vpm" denotes the maximum power point voltage, "n" denotes the number of the bypass diodes D for the strings 10 that are not shaded, and "m" denotes the number of all the bypass diodes D.

In Equation (1), in a case where none of all the strings 10 is shaded, "n=m", and at this time, in a state where all the bypass diodes operate normally, the maximum power point voltage "Vpm" is the value of "Voc×a".

In Equation (1), both "n" and "m" are integer values, and a value of m denoting the number of all the bypass diodes D is known. If all the bypass diodes are in the normal state, in Equation (1), the maximum power point voltage "Vpm" is n times the value of "Voc×a/m".

Accordingly, the value of the maximum power point voltage "Vpm" is compared with a value that is n times "Voc×a/m". If the two values are close to each other within a predetermined error limit, it is determined that the bypass diode D is in the normal state.

However, the number of the not-shaded strings of all the strings 10, and the number n (n is an integer) of the bypass diodes that are installed on the strings that are not shaded are not known. Therefore, according to the present disclosure, the control unit 30 compares the value of the maximum power point voltage "Vpm" with a value that is k (k is an arbitrary integer value that ranges from 1 to m−1) times "Voc×a/m" (Step S2 in FIG. 3), and, in a case where the two values are close to each other within the predetermined second error limit, determines that the bypass diode D are in the normal state (Step S3 in FIG. 3).

In addition, in this case, it is determined that at least one or more solar photovoltaic battery strings are shaded or contaminated with a foreign material.

At this point, examples of k (k is an integer) times include one time, two times, three times, and so forth up to (m−1) times, and "the number of all the strings=the number of all the bypass diodes=m". If at least one string 10 is shaded, when "the number of the not-shaded strings=the number of the bypass diodes for the not-shaded strings=n", a relationship "n<m" is established.

Therefore, the value of the maximum power point voltage "Vpm" is sequentially compared with values that are one times, two times, three times and so forth up to (m−1) times "Voc×a/m" (values that are k (k is an integer) times "Voc× a/m"). In a case where the two values that are compared are close to each other within the predetermined second error limit, it can be determined that the bypass diode D is in the normal state.

That is, in the bypass diode malfunctioning diagnosis process according to the present disclosure, if the difference (the error) between the value of the maximum power point voltage "Vpm" and the value of "Voc×a" is out of the first error limit, but a difference (an error) between the value of the maximum power point voltage "Vpm" and a value that is k (k is an integer) times "Voc×a/m" is within the second error limit, the control unit 30 determines that all the bypass diodes D are in the normal state.

However, in this case, all the bypass diodes D operate normally, but at least one of all the strings 10 is in the shaded state.

When at least one of all the strings is shaded and when the condition that the number of the shaded strings of all the strings is the same is established, although an area of a shaded portion of the same string or the number of the shaded cells varies, for example, increases or decreases, if the bypass diode for the string is in the normal state, the graph I-V of current versus voltage and the graph P-V of current versus voltage do not change.

However, in a case where the number of the shaded strings of all the strings varies, the graph I-V of current versus voltage and the graph P-V of current versus voltage vary.

For example, according to Equation (1), in a case where, as illustrated in FIG. 5, only one string of four strings is shaded, when all the bypass diodes are in the normal state, the maximum power point voltage "Vpm" can be calculated as "Voc×(¾)×a".

At this point, a (for example, a=0.8), as described above, is defined as the value of Vpm/Voc, and is a value that is determined according to a characteristic of a cell, a specification of a cell, and a specification of a system. The control unit knows in advance this value of a.

On the other hand, when all the bypass diodes are in the normal state, in a case where two strings of four strings are shaded, the maximum power point voltage "Vpm" can be calculated as a value of "Voc×(2/4)×a".

That is, in a case where one string is shaded, a position of the maximum power point voltage "Vpm" on the graph P-V of current versus voltage is in the vicinity of "Voc×(¾)×a", but, in a case where two strings are shaded, the position of the maximum power point voltage "Vpm" changes and thus is in the vicinity of "Voc×(2/4)×a".

Next, FIG. 7 illustrates a state where one bypass diode of the total of four bypass diodes D is damaged and thus the bypass circuit C is open, and illustrates a state where one string (the 4-fourth string) of the total of four strings 10 is shaded at the same time.

As described above, in a case where all the bypass diodes operate normally, when the number of the shaded solar photovoltaic battery strings is the same, regardless of an area of a shaded portion of the shaded string or the number of the shaded cells, the graph I-V of current versus voltage and the graph P-V of current versus voltage remain unchanged.

However, as illustrated in FIG. 7, if at least one of all the bypass diodes 10 is damaged and thus the number of the shaded cells or the area of the shaded portion changes in the string 10 (the fourth string), the bypass diode for which is damaged, the graph I-V of current versus voltage and the graph P-V of current versus voltage change depending on the number of the shaded cells or the area of the shaded portion.

FIGS. 8A, 8B, and 8C illustrate the graph I-V of current versus voltage and the graph P-V of current versus voltage, in a case where one cell 11 is shaded, in a case where two cells 11 are shaded, and in a case where three cells 11 are shaded, respectively, when, as illustrated in FIG. 7, one bypass diode D is damaged and thus the bypass circuit C (that is, the circuit on which the damaged diode is installed) is open.

If at least one bypass diode of all the bypass diodes D is damaged and thus the bypass circuit C is open, regardless of the number of the shaded cells 11 or the area of the shaded portion in the string (the fourth string), the bypass diode for which is damaged, the difference (the error) between the value of the maximum power point voltage "Vpm" and the value that is k (k is an integer) times "Voc×a/m" is always out of the second error limit.

For example, in all FIGS. 8A, 8B, and 8C, the difference (the error) between the value of the maximum power point voltage "Vpm" and the value that is k (k is an integer) times "Voc×a/m" is out of the second error limit.

Accordingly, the control unit 30 can be set to determine that at least one bypass diode of all the bypass diodes D is damaged and thus the bypass circuit C is in an open state, if a state where the difference (the error) between the value of the maximum power point voltage "Vpm" and the value of "Voc×a" is out of the first error limit is entered and, at the same time, a state where the difference (the error) between the value of the maximum power point voltage "Vpm" and the value that is k (k is an integer) times "Voc×a/m" is out of the second error limit is entered, in the bypass diode malfunctioning diagnosis process according to the present disclosure (Step S5 in FIG. 3).

If, in this manner, the bypass circuit C is in the open state due to the malfunctioning of the bypass diode D, the control unit 30 interrupts the MPPT control, and turns off a solar photovoltaic battery switch that is not illustrated, in order to interrupt operation of the solar photovoltaic battery system (Step S6 in FIG. 3). Subsequently, the control unit 30 controls the operation of the alerting device 40 and thus alerts the operator to the malfunctioning state of the bypass diode D (Step S7 in FIG. 3). At this time, through the alerting device 40, the control unit 30 can alert the operator that the bypass circuit C is in the open state.

On the other hand, as described above, the control unit 30 determines that all the bypass diodes D are in the normal state, if the state where the difference (the error) between the value of the maximum power point voltage "Vpm" and the value of "Voc×a" is out of the first error limit is entered, but a state where the difference (the error) between the value of the maximum power point voltage "Vpm" and the value that is k (k is an integer) times "Voc×a/m" is within the second error limit is entered (S3).

As illustrated in FIG. 8A, in a case where one cell 11 is shaded, the maximum power point voltage "Vpm" occurs at a point of approximate "Voc×½". As illustrated in FIG. 8B, in a case where two cells 11 are shaded, the maximum power point voltage "Vpm" occurs at a point of approximate "Vpm". As illustrated in FIG. 8C, in a case where three cells 11 are shaded, it is possible that the maximum power point voltage "Vpm" is measured as a value that is completely different from those in FIGS. 4 and 6, but a value of current is difficult to measure.

That is, in all FIGS. 8A, 8B, and 8C, the difference (the error) between the value of the maximum power point voltage "Vpm" and the value that is k (k is an integer) times "Voc×a/m" is out of the second error limit.

Therefore, according to the present disclosure, the malfunctioning of the bypass diode D and the open state of the bypass circuit C due to the malfunctioning of the bypass diode D are diagnosed on the basis of the maximum power point voltage Vpm and the open circuit voltage Voc.

On the other hand, FIG. 9 is a diagram illustrating a state where all cells 11 in the shaded string 10 are shaded, and FIG. 10 illustrates the group I-V of current versus voltage and the group P-V of power versus voltage in the state in FIG. 9.

FIG. 9 illustrates a state where at least one bypass diode of all the bypass diodes D, for example, one bypass diode of the total of four bypass diodes is damaged and thus where the bypass circuit C is open, and illustrates a state where one string (the fourth string) of the total of four strings 10 is shaded.

Particularly, a state where all cells 11 in the string (the fourth string) are shaded is illustrated.

In this case, as illustrated in FIG. 10, the graph I-V of current versus voltage takes the form of a "¬"-shaped curve in a manner similar to the normal state, and at this time, the difference (the error) between the value of the maximum power point voltage "Vpm" and the value of "Voc×a" can be within the predetermined first error limit.

That is, when all the cells 11 in the string 10 are shaded in the malfunctioning state of the bypass diode D as illustrated in FIG. 9, the maximum power point voltage "Vpm" is close to the value of "Voc×a", but the maximum power point current Ipm is lower than that in the normal state.

In the normal state of the bypass diode D, the value of "Ipm/Voc" is a value b that is somewhat unique according to the solar photovoltaic battery cell. As illustrated in FIG. 9, in a case where all the cells 11 in the string 10 are shaded due to the malfunctioning of the bypass diode D and the open state of the bypass circuit C, "Imp/Voc<b".

Accordingly, the control unit 30 can be set to determine that at least one bypass diode of all the bypass diodes D is in the malfunctioning state and thus the bypass circuit C on which the bypass diode D in the malfunctioning state is installed is in the open state (S5 in FIG. 3), in a case where the difference (the error) between the value of the maximum power point voltage "Vpm" and the value of "Voc×a" is within the first error limit and at the same time, "Ipm/Voc<b" (Step S4 in FIG. 3).

At this point, "b" is a value that is predetermined and is a setting value for determining the open state of the bypass circuit C due to the malfunctioning of the bypass diode D. The setting value "b" is input in advance into the control unit 30 for storage and is used in the bypass diode malfunctioning diagnosis process according to the present disclosure.

Next, FIG. 11 is a diagram illustrating a state where at least one bypass diode D of all the bypass diodes is damaged and thus the bypass circuit C is shorted, and FIG. 12 is a diagram illustrating the graph I-V of current versus voltage and the graph P-V of power versus voltage in the malfunctioning state in FIG. 11.

FIG. 11 illustrates an example where at least one bypass diode of all the bypass diodes D, for example, one bypass diode of the total of four bypass diodes D is damaged and thus the bypass circuit C is shorted.

In a case where, in this manner, one string (the fourth string) of the total of four strings 10 is damaged and thus the bypass circuit C for the string (the fourth string) is shorted, current that is generated in the string is not collected.

As known from FIG. 12, even in the malfunctioning state in FIG. 11, the group I-V of current versus voltage takes the form of a "¬"-shaped curve in a manner similar to the normal state in FIG. 4. At this time, the difference (the error) between the value of the maximum power point voltage "Vpm" and the value of "Voc×a" can be within the first error limit.

That is, even in a case where the bypass circuit C is shorted due to the malfunctioning state of the bypass diode D as illustrated in FIG. 11, the maximum power point voltage "Vpm" can be close to the value of "Voc×a".

In addition, the open circuit voltage "Voc" (refer to FIG. 12) in the malfunctioning state of the diode in FIG. 11 is lower than the open circuit voltage "Voc" (refer to FIG. 4) in the normal state of the diode, and, when FIGS. 4 and 12 are compared, the open circuit voltage "Voc" in FIG. 12 is approximately ¾ times the open circuit voltage "Voc" in FIG. 4.

At this time, the maximum power point current "Imp" is the same as that in the normal state of the diode, and, as a result, in a case where the malfunctioning state as illustrated in FIG. 11 is entered, "Ipm/Voc>b".

Accordingly, the control unit 30 can be set to determine that at least one bypass diode of all the bypass diodes D is in the malfunctioning state and thus the bypass circuit C on which the bypass diode D in the malfunctioning state is installed is in a shorted state (S9 in FIG. 3), in a case where the difference (the error) between the value of the maximum power point voltage "Vpm" and the value of "Voc×a" is within the first error limit and at the same time, "Ipm/Voc>b" (Step S8 in FIG. 3).

If, in this manner, the bypass circuit C is in the shorted state due to the malfunctioning of the bypass diode D, the control unit 30 interrupts the MPPT control, and turns off the solar photovoltaic battery switch in order to interrupt the operation of the solar photovoltaic battery system (Step S10 in FIG. 3). Subsequently, the control unit 30 controls the operation of the alerting device 40 and thus alerts the operator to the malfunctioning state of the bypass diode D (Step S11 in FIG. 3). At this time, through the alerting device 40, the control unit 30 can alert the operator that the bypass circuit C is in the open state.

Then, in a case where the difference (the error) between the maximum power point voltage "Vpm" and the value of "Voc×a" is within the first error limit and, at the same time, "Ipm/Voc=b", the control unit 30 determines that all the bypass diodes D are in the normal state (Step S12 in FIG. 3).

On the other hand, FIG. 13 is a diagram illustrating a malfunctioning diagnosis process according to another embodiment of the present disclosure, and changing from Step S2 in the malfunctioning diagnosis process in FIG. 3 to Step S2' in FIG. 13 and replacement of Step S2 in the malfunctioning diagnosis process in FIG. 3 with Step S2' in FIG. 13 are possible.

The embodiment in FIG. 13 is an embodiment that results from performing changing from a method that distinguishes between Step S3 and Step S5 in the malfunctioning diagnosis process in FIG. 3 to Step S2'.

As illustrated in FIG. 5, in a case where all the bypass diodes D are in the normal state and where one cell 11 in one string (the fourth string) of all the strings 10 is shaded, the graph of current versus voltage and the graph of power versus voltage are as illustrated in FIG. 6.

Then, as illustrated in FIG. 7, when at least one bypass diode of all the bypass diodes D is damaged and thus the bypass circuit C is in the open state, and when at least one string (the fourth string) of all the strings 10 is in the shaded state, the graph I-V of current versus voltage and the graph P-V of power versus voltage are as illustrated in FIGS. 8A, 8B, and 8C.

In addition, when one cell is shaded according to a characteristic of the solar photovoltaic battery cell, an amount of dropping voltage is determined by an internal characteristic of the diode in the solar photovoltaic battery.

When this value is defined as "c", in a case where, as illustrated in FIG. 7, the bypass diode D is damaged and thus the bypass circuit C is in the open state, as known from FIGS. 8A and 8B, on the graph of current versus voltage, current increases according to the number/of the shaded cells 11 in the string (the fourth string), starting from a value of voltage in the vicinity of "Voc−c×l" (where l is an integer value that ranges from 1 to the number of all cells) or less.

Accordingly, as in Step S2' in FIG. 13, the value of the maximum power point voltage "Vpm" and a value of "(Voc−c×l)×a" are compared, and in a case where a difference (an error) between the two values is within a predetermined third error limit, the control unit 30 can determine that the damage to the bypass diode D occurs (S5).

In a case where in Step S2' in FIG. 13, the difference (the error) between the maximum power point voltage "Vpm" and the value of "(Voc−c×l)×a" is out of the predetermined third error limit, the control unit 30 determines that the bypass diode D is in the normal state (S3).

Next, FIG. 14 is a diagram illustrating a malfunctioning diagnosis process according to still another embodiment of the present disclosure, and changing from Step S2 in the malfunctioning diagnosis process in FIG. 3 to Step S2 in FIG. 14 and replacement of Step S2 in the malfunctioning diagnosis process in FIG. 3 with Step S2 in FIG. 14 are possible.

The embodiment in FIG. 14 is an embodiment that results from performing changing from a method that distinguishes between Step S3 and Step S5 in the malfunctioning diagnosis process in FIG. 3 to Step S2".

The graph I-V of current versus voltage and the graph P-V of power versus voltage in FIG. 15 results from again plotting the graph in FIG. 6 and the graphs in FIGS. 8A and 8B.

The value of "Voc×n/m" or "Voc−c×l" in a case where the diode operates normally is similar to that in a case where the bypass circuit is open due to the damage to the diode, depending on a type of the cell or the number of the cells, and the number of the strings that are determined when configuring the solar photovoltaic battery system. Thus, cases can occur where it is difficult to distinguish between and determine normality and abnormality (the damage to the diode).

In these cases, the control unit 30 determines the trend for current to change with voltage in the vicinity of the value of "Voc−c×l", that is, whether or not a slope of the graph I-V of current versus voltage is continuous. Thus, it is possibly determined that when the slope is discontinuous, the diode is in the normal state in Step S3 and that when the slope is continuous, the diode is in the abnormal state in Step S5.

In a case where the slope is discontinuous, as illustrated by an upper graph (which is the same as that in FIG. 6) in FIG. 15, a value of current at a voltage value of "Vpm×1/a" is a value close to 0, which is much smaller than Ipm. On the other hand, in a case where the slope is continuous, as illustrated by a middle graph (which is the same as that in FIG. 8A) and a lower graph (which is the same as that in FIG. 8B) in FIG. 15, a value of current at "Vpm×1/a" is equal to or greater than the product of Imp and a specific value ("Ipm×d").

When the specific value that is determined according to a characteristic of the diode and a characteristic of the bypass diode in the solar photovoltaic battery is defined as "d", (the specific value is 0.4 in FIG. 15), it is possibly determined that, if the value of current at a "Vpm×1/a" voltage point, which is obtained from a signal of the solar photovoltaic battery detection unit, is lower than "Ipm×d", the diode is in the normal state in Step S3, and that, if the value of current at "Vpm×1/a" is equal to or higher than "Ipm×d", the diode is in the abnormal state in Step S5.

On the other hand, when at least one bypass diode D is damaged and thus the bypass circuit C is in the open state, in a case where the number of the shaded cells 11 or a ratio for the area of the shaded portion in the string (the fourth string) increases as in FIG. 16, the open circuit voltage Voc and the maximum power point voltage Vpm are measured. However, the value of current is close to 0, and, as in FIG. 17, an output is seldom produced from a solar photovoltaic battery panel P.

For the reason described above, in a case where the control unit 30 does not precisely read the value of current, in order to distinguish between the normal state where, in a situation in which light is absent, the output is not produced from the solar photovoltaic battery panel P, and the abnormal state where, even in a situation in which light is present, the output is not produced from the solar photovoltaic battery panel P, it is possible that the intensity-of-illumination sensor 22 or the imaging device 23 which is installed in a vehicle is utilized.

FIGS. 18 and 19 illustrate the malfunctioning diagnosis process that can be added in addition to the process in FIG. 3. FIG. 18 illustrates a process that determines the abnormality of the solar photovoltaic battery panel P using the intensity-of-illumination sensor 22. FIG. 19 illustrates a process that determines the abnormality of the solar photovoltaic battery panel P using the imaging device 23.

The imaging device 23 can acquire images of a vehicle and of the vicinity of the vehicle. The imaging device 23 may include multiple cameras (not illustrated) that are mounted on the vehicle, and may be a known viewing-around monitoring system (not illustrated) that is mounted on the vehicle.

First, as illustrated in FIG. 18, on the basis of current that is detected by the solar photovoltaic battery output sensor 21 and intensity of illumination that is detected by the intensity-of-illumination sensor 22, the control unit 30 can determine in a distinguished manner whether the solar photovoltaic battery panel P is normal or abnormal.

That is, when the open circuit voltage Voc is higher than 0, and, at this time, the current and the intensity of illustration that are detected by the sensors 21 and 22 are both close to 0 within error limits, respectively, that are set, the normal state is entered. However, although the detected current is close to 0, if a state where the intensity of the illumination is not close to 0 is attained (that is, if an amount of light that is at a fixed level or higher is present), it can be determined that the solar photovoltaic battery panel P or at least one of the bypass diodes D is in the abnormal state.

In addition, in a case where the imaging device 23 is used, the control unit 30 receives pieces of image information on a vehicle and the vicinity of the vehicle, which are provided by the imaging device 23 of the vehicle, for example, by the viewing-around monitoring system of the vehicle.

At this time, the control unit 30 determines whether or not the solar photovoltaic battery panel and the bypass diode are abnormal, from the value of current that is detected by the solar photovoltaic battery output sensor 21 and from the image information that is provided by the imaging device.

FIGS. 20A and 20B illustrate pieces of information on a vehicle and the vicinity of the vehicle. A rectangle "A1" that is indicated by a dotted line represents a portion of a vehicle body, to which the solar photovoltaic battery panel is provided. A rectangle "A2" that is indicated by a dotted line represents a portion that is shaded.

FIG. 20A illustrates a state where the solar photovoltaic battery panel is not shaded. FIG. 20B illustrates a state where at least one portion of the solar photovoltaic battery panel is shaded.

FIG. 20B illustrates an example where a trunk portion (an area where "A1" and "A2" overlap) of the vehicle is shaded.

As illustrated in FIG. 19, the open circuit voltage Voc is higher than 0 and, at this time, the value of current detected by the solar photovoltaic battery output sensor 21 is close to 0 within an error limit. However, if light is identified from the image information that is provided by the imaging device 23, the control unit 30 can determine that the normal state is entered.

However, when the detected value of current is close to 0 within a given error limit and when light is identified from the image information, in a case where, from the image information, it is identified that at least one portion of the solar photovoltaic battery panel is shaded in an overlapping manner, the control unit 30 determines that the bypass diode is in the abnormal state.

On the other hand, when the detected value of current is close to 0 and when light is identified from the image information, in a case where, from the image information, it is identified that the solar photovoltaic battery panel is not shaded in an overlapping manner, the control unit 30 determines that the solar photovoltaic battery panel is in the abnormal state.

In a case where, in this manner, the intensity-of-illumination sensor 22 and the imaging device 23 that are installed in the vehicle are additionally used, when the malfunction state is difficult to diagnose in the malfunctioning diagnosis process in FIG. 3, additional diagnoses of the malfunctioning are possible such as the determination of the abnormality of the solar photovoltaic battery panel or the determination of the abnormality of the bypass diode.

The embodiment of the present disclosure is described in detail above, but this does not impose a limit on the claimed scope of the present disclosure. Various modifications and improvements that a person of ordinary skill in the art makes using the basic concept of the present disclosure that is defined in the following claims are also included in the claimed scope of the present disclosure.

What is claimed is:

1. A method of diagnosing malfunctioning of one of bypass diodes in a solar photovoltaic battery system, the method comprising:

collecting, by a control unit, solar photovoltaic battery operation information indicating a solar photovoltaic battery operation state, from a signal of a solar photovoltaic battery detection unit, while maximum power point tracking control is performed with the solar photovoltaic battery system in operation; and determining, by the control unit, whether or not all of the bypass diodes installed in the bypass circuits for multiple solar photovoltaic battery strings malfunction based on the collected solar photovoltaic battery operation information, wherein the solar photovoltaic battery operation information includes open circuit voltage in a circuit having the multiple solar photovoltaic battery strings, and maximum power point voltage for the maximum power point tracking control, and wherein the solar photovoltaic battery system includes the multiple solar photovoltaic battery strings, each being configured with multiple solar photovoltaic battery cells or solar photovoltaic battery modules that are serially connected, and which has a configuration in which a bypass circuit is connected between both ends of each solar photovoltaic battery string in a state where the multiple solar photovoltaic battery strings are serially connected and in which the one of bypass diodes is installed in each bypass circuit for each of the solar photovoltaic battery strings, wherein malfunctioning of the one of bypass diodes is determined, by the control unit, by comparing a voltage value of "Voc×a" and a Vpm value where Voc, a, and Vpm represent the open circuit voltage, a predetermined value, and the maximum power point voltage, respectively.

2. The method according to claim 1, wherein the determining of whether or not all of the bypass diodes malfunction comprises:

comparing, by the control unit, a value that is k times (k is an integer value that ranges from 1 to m−1) "Voc× a/m" (m is the number of all of the bypass diodes), when an error between the voltage value and the Vpm value exceeds a predetermined first error range; and determining, by the control unit, that the one of bypass diodes is in a malfunctioning state when an error between the value that is k times "Voc×a/m" and the Vpm value is exceeds a predetermined second error range.

3. The method according to claim 2, wherein the method comprises:
obtaining the predetermined value (a); and
setting the predetermined value as a value of a ratio of the maximum power point voltage (Vpm) to the open circuit voltage (Voc) when all of the bypass diodes are in a operation state and when none of the solar photovoltaic battery strings is shaded.

4. The method according to claim 2, wherein the method comprises:
when the value that is k times "Voc×a/m" and the Vpm value are within the second error range, determining, by the control unit, that all of the bypass diodes are in a operation state.

5. The method according to claim 2, wherein the method comprises:
when the error between the value that is k times "Voc×a/m" and the value of Vpm exceeds the second error range, determining, by the control unit, that the bypass pass circuit is in an open state due to the malfunctioning state of the one of bypass diodes.

6. The method according to claim 1, wherein the solar photovoltaic battery operation information further includes maximum power point current in the circuit having the multiple solar photovoltaic battery strings.

7. The method according to claim 6, wherein the determining of whether or not all of the bypass diodes malfunction comprises:
determining, by the control unit, whether or not "1pm/Voc<b" (b is a predetermined value) when the voltage value and the Vpm value are within a predetermined first error range; and
determining, by the control unit, that the one of bypass diodes is in a malfunctioning state when "1pm/Voc<b".

8. The method according to claim 7, wherein the method comprises:
obtaining the predetermined value (a); and
setting the predetermined value as a value of a ratio of the maximum power point voltage (Vpm) to the open circuit voltage (Voc) when all of the bypass diodes are in a operation state and when none of the solar photovoltaic battery strings is shaded.

9. The method according to claim 7, wherein the method comprises:
when "1pm/Voc<b", determining, by the control unit, that the bypass circuit is in an open state due to the malfunctioning state of the one of bypass diodes.

10. The method according to claim 7, wherein the determining of whether or not all of the bypass diodes malfunction further comprises:
determining, by the control unit, whether or not "1pm/Voc>b" when "1pm/Voc~b"; and
determining, by the control unit, that the one of bypass diodes is in the malfunctioning state when "1pm/Voc>b".

11. The method according to claim 10, wherein the method comprises:
when "1pm/Voc>b", determining, by the control unit, that the bypass circuit is in a shorted state due to the malfunctioning state of the one of bypass diodes.

12. The method according to claim 10, wherein the method comprises:
when "1pm/Voc=b", determining, by the control unit, that all of the bypass diodes are in a operation state.

13. The method according to claim 1, wherein the method comprises:
when it is determined that an output-decreasing state where a solar photovoltaic battery output decreases equal to or less than a given value is entered, collecting, by the control unit, the solar photovoltaic battery operation information and determining whether or not all of the bypass diodes malfunction.

14. The method according to claim 1, wherein the method comprises:
when it is determined that the one of bypass diodes is in the malfunction state, alerting, by the control unit, an operator of an alerting device of the malfunctioning state of the one of bypass diodes.

15. The method according to claim 1, wherein the determining of whether or not all of the bypass diodes malfunction comprises:
comparing, by the control unit, a value of "(Voc−c×l)×a", where c is obtained and set as an amount of dropping voltage that results when one cell is shaded and/is an integer that ranges from 1 to the number of all cells, and the Vpm value when an error between the voltage value and the Vpm value exceeds a predetermined first error range; and
determining, by the control unit, that the one of bypass diodes is in a malfunctioning state when an error between the value of "(Voc−c×l)×a" and the Vpm value exceeds a predetermined third error range.

16. The method according to claim 15, wherein the method comprises:
obtaining the predetermined value (a); and
setting the predetermined value (a) as a value of a ratio of the maximum power point voltage (Vpm) to the open circuit voltage (Voc) when all of the bypass diodes are in a operation state and when none of the solar photovoltaic battery strings is shaded.

17. The method according to claim 1, wherein the determining of whether or not all of the bypass diodes malfunction comprises:
comparing a value of current at a "Vpm×1/a" voltage point, which is obtained from a signal of the solar photovoltaic battery detection unit, and a value of "1pm×d" where d is a predetermined value, when an error between the voltage value and the Vpm value exceeds a predetermined first error range; and
determining, by the control unit, that the one of the bypass diodes is in a malfunctioning state when the value of current at the "Vpm×1/a" voltage point is equal to or greater than "1pm×d".

18. The method according to claim 17, wherein the method comprises:
obtaining the predetermined value (a); and
setting the predetermined value (a) as a value of a ratio of the maximum power point voltage (Vpm) to the open circuit voltage (Voc) when all of the bypass diodes are in a operation state and when none of the solar photovoltaic battery strings is shaded.

19. A method of diagnosing malfunctioning of one of bypass diodes in a solar photovoltaic battery system, the method comprising:
collecting, by a control unit, solar photovoltaic battery operation information indicating a solar photovoltaic battery operation state, from a signal of a solar photovoltaic battery detection unit, while maximum power point tracking control is performed with the solar photovoltaic battery system in operation; and determining, by the control unit, whether or not all of the bypass diodes installed in the bypass circuits for the solar photovoltaic battery strings malfunction based on the collected solar photovoltaic battery operation information, wherein the solar photovoltaic battery operation information includes open circuit voltage in a circuit having multiple solar photovoltaic battery strings, and maximum power point voltage for maximum power point tracking control, and wherein the solar photovoltaic battery system includes the multiple solar photovoltaic battery strings, each being configured with multiple solar photovoltaic battery cells or solar photovoltaic battery modules that are serially connected, and which has a configuration in which a bypass circuit is connected between both ends of each solar photovoltaic battery string in a state where the multiple solar photovoltaic battery strings are serially connected and in which the one of bypass diodes is installed in each bypass circuit for each of the solar photovoltaic battery strings, wherein the method further comprises:

determining, by the control unit, whether or not a solar photovoltaic battery panel is malfunction based on current that is detected by the solar photovoltaic battery detection unit and intensity of illumination that is detected by an intensity-of-illumination sensor; and determining, by the control unit, that the solar photovoltaic battery panel or the one of bypass diodes is in a malfunction state when:
  the open circuit voltage is equal to or greater than 0,
  the detected value of current is close to 0 within a given error range; and
  it is determined that an amount of light that is at a fixed level or higher is present from a value of the intensity of illumination.

20. A method of diagnosing malfunctioning of a one of bypass diodes in a solar photovoltaic battery system, the method comprising:

collecting, by a control unit, solar photovoltaic battery operation information indicating a solar photovoltaic battery operation state, from a signal of a solar photovoltaic battery detection unit, while maximum power point tracking control is performed with the solar photovoltaic battery system in operation; and determining, by the control unit, whether or not all of the bypass diodes installed in the bypass circuits for the solar photovoltaic battery strings malfunction based on the collected solar photovoltaic battery operation information, wherein the solar photovoltaic battery operation information includes open circuit voltage in a circuit having multiple solar photovoltaic battery strings, and maximum power point voltage for maximum power point tracking control, and wherein the solar photovoltaic battery system includes the multiple solar photovoltaic battery strings, each being configured with multiple solar photovoltaic battery cells or solar photovoltaic battery modules that are serially connected, and which has a configuration in which a bypass circuit is connected between both ends of each solar photovoltaic battery string in a state where the multiple solar photovoltaic battery strings are serially connected and in which the one of bypass diodes is installed in each bypass circuit for each of the solar photovoltaic battery strings, wherein the method further comprises:

acquiring, by the control unit, pieces of image information on a vehicle and the vicinity of the vehicle through an imaging device of the vehicle;

determining, by the control unit, that the one of bypass diodes is in a malfunction state when:
  it is identified from the image information that at least one portion of a solar photovoltaic battery panel installed in the vehicle is shaded in an overlapping manner;
  the open circuit voltage is equal to or greater than 0;
  the detected value of current that is detected by the solar photovoltaic battery detection unit is close to 0 within a given error range; and
  light is identified from the image information; and determining, by the control unit, the solar photovoltaic battery panel is in a malfunction state when:
  it is identified that the solar photovoltaic battery panel is not shaded in an overlapping manner;
  the open circuit voltage is equal to or greater than 0;
  the detected value of current detected by the solar photovoltaic battery detection unit is close to 0 within a given error range; and
  light is identified from the image information.

* * * * *